(12) United States Patent
Norman

(10) Patent No.: US 9,465,441 B2
(45) Date of Patent: Oct. 11, 2016

(54) NAVIGATION DEVICE

(71) Applicant: STMicroelectronics (Research & Development) Limited, Marlow, Buckinghamshire (GB)

(72) Inventor: Benjamin E. Norman, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 183 days.

(21) Appl. No.: 13/710,141

(22) Filed: Dec. 10, 2012

(65) Prior Publication Data

US 2013/0154921 A1    Jun. 20, 2013

(30) Foreign Application Priority Data

Dec. 15, 2011 (GB) .................................. 1121578.7

(51) Int. Cl.
| | | |
|---|---|---|
| *G06F 3/042* | (2006.01) | |
| *G06F 3/01* | (2006.01) | |
| *G06F 3/0488* | (2013.01) | |
| *G06F 21/36* | (2013.01) | |

(52) U.S. Cl.
CPC ............. *G06F 3/017* (2013.01); *G06F 3/042* (2013.01); *G06F 3/04883* (2013.01); *G06F 21/36* (2013.01); *G06F 2203/04109* (2013.01)

(58) Field of Classification Search
CPC .. G06F 3/0304–3/0325; G06F 3/042–3/0428; G06F 2203/04109
USPC ....................... 345/156, 166, 175; 178/18.09
See application file for complete search history.

(56) References Cited

U.S. PATENT DOCUMENTS

| | | | | |
|---|---|---|---|---|
| 5,229,551 A | * | 7/1993 | McDermott | .......... G06F 3/0418 178/18.02 |
| 2008/0061220 A1 | * | 3/2008 | Machida | ................ G06F 3/0317 250/221 |
| 2011/0141487 A1 | * | 6/2011 | Raynor | ................... G06F 3/042 356/614 |
| 2011/0260829 A1 | | 10/2011 | Lee | |

FOREIGN PATENT DOCUMENTS

| | | | | |
|---|---|---|---|---|
| EP | 2 262 208 A1 | * | 7/2010 | .......... H04M 1/2745 |
| EP | 2 262 208 A1 | | 12/2010 | |
| EP | 2 423 793 A2 | | 2/2012 | |
| GB | WO 98/33414 | * | 7/1998 | |
| GB | 2 438 524 A | | 11/2007 | |
| GB | 2438524 A | * | 11/2007 | |
| WO | WO 98/33141 A1 | | 7/1998 | |
| WO | WO 99/42920 | * | 8/1999 | ............... G06K 9/22 |
| WO | WO 99/42920 A1 | | 8/1999 | |

OTHER PUBLICATIONS

Great Britain Search Report dated Apr. 10, 2012 from corresponding Great Britain Application No. 1121578.7.

* cited by examiner

*Primary Examiner* — Ilana Spar
*Assistant Examiner* — Jeffrey S Steinberg
(74) *Attorney, Agent, or Firm* — Gardere Wynne Sewell LLP

(57) ABSTRACT

An optical navigation device, including a radiation source capable of producing a beam of radiation; a sensor for receiving an image; and an optical element for identifying movement of an object on a first surface to thereby enable a control action to be carried out. The optical element is such that a whole of the imaged area of the first surface is substantially covered by the object in normal use. The device is operable to receive from the object on the first surface an input describing a pattern, to compare the received pattern to a stored reference pattern and to perform a predetermined function if the received pattern and stored reference pattern are substantially similar. The pattern may be a continuous line, the device being operable to store the continuous line as a set of turning points in chronological order.

29 Claims, 5 Drawing Sheets

NAVIGATION DEVICE

CROSS REFERENCE TO RELATED APPLICATIONS

This application claims the priority benefit of Great Britain patent application number 1121578.7, filed on Dec. 15, 2011, which is hereby incorporated by reference to the maximum extent allowable by law.

BACKGROUND

1. Technical Field

The present disclosure relates to an improved navigation device, particularly an optical navigation device such as a finger mouse which can be used to unlock a device such as a mobile phone.

2. Discussion of the Related Art

Mobile phones are a common piece of equipment and are increasingly being used for identification for business transactions. However, they are vulnerable to theft, allowing for easy impersonation. Mobile phones include security systems such as passwords and personal identification numbers (PIN) to lock or access the phone itself or certain applications on the phone. Most of the commonly used security techniques and systems are often easily overcome. For example, passwords and PINs can be accessed by so called "shoulder-surfing". Criminals use optical devices to watch users making transactions and then gain access to account details, passwords, PINs, etc. Alternatively in crowded places, criminals literally look over the shoulder of a user to determine certain information. Another problem with passwords is that their entry takes a significant amount of time as mobile phones lack a full sized keyboard.

The default distribution of the Android® operating system contains an option to set a pattern based lockscreen. A 3×3 grid of dots is presented which are connected by the user to form a continuous pattern, used in place of a PIN or password. This method however requires a touch screen for the pattern input and is extremely susceptible to the "shoulder surfing" techniques described above.

It is an object of the present disclosure to overcome at least some of the problems associated with the prior art.

SUMMARY

The present disclosure provides a method and system as set out in the accompanying claims.

According to a first aspect, there is provided an optical navigation device, comprising a radiation source capable of producing a beam of radiation; a sensor for receiving an image; and an optical element for identifying movement of an object on a first surface to thereby enable a control action to be carried out and being operable such that a whole of the imaged area of the first surface is substantially covered by said object in normal use; wherein said device is operable to receive from said object on said first surface an input describing a pattern, to compare the received pattern to a stored reference pattern and to perform a predetermined function if the received pattern and stored reference pattern are substantially similar.

According to a second aspect, there is provided a navigation device for receiving an input to thereby enable a control action to be carried out, said device being operable:

to receive an input describing a pattern comprising a continuous line;

to store the line as a set of turning points with reference to two or more predetermined axes, each turning point being a point where the continuous line reverses in direction with respect to one of said axes, said set of turning points comprising directional information attributed to each turning point in the set, in chronological order;

to compare the received pattern to a stored reference pattern by performing a comparison of the set of turning points of said received pattern to a set of turning points defining a stored reference pattern; and to perform a predetermined function if the received pattern and stored reference pattern are substantially similar.

The second aspect can be implemented on any type of navigation device and both the first and second aspects can be placed in any appropriate location including phones, computers, cash dispensers, checkouts in shops, gates, doors and other entrances/exits or any other appropriate location.

Other optional aspects and features are described in the appended dependent claims.

BRIEF DESCRIPTION OF THE DRAWINGS

Reference will now be made, by way of example, to the accompanying drawings, in which.

DETAILED DESCRIPTION

Figure 1:
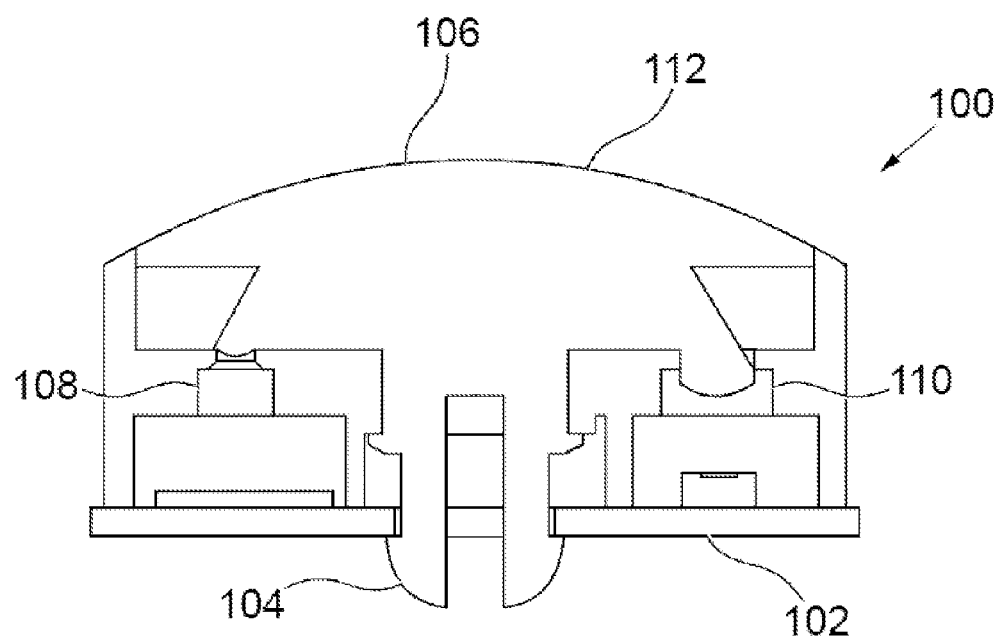
FIG. 1 is a cross-sectional diagram of an optical navigation device, given by way of example.
Figure 2:
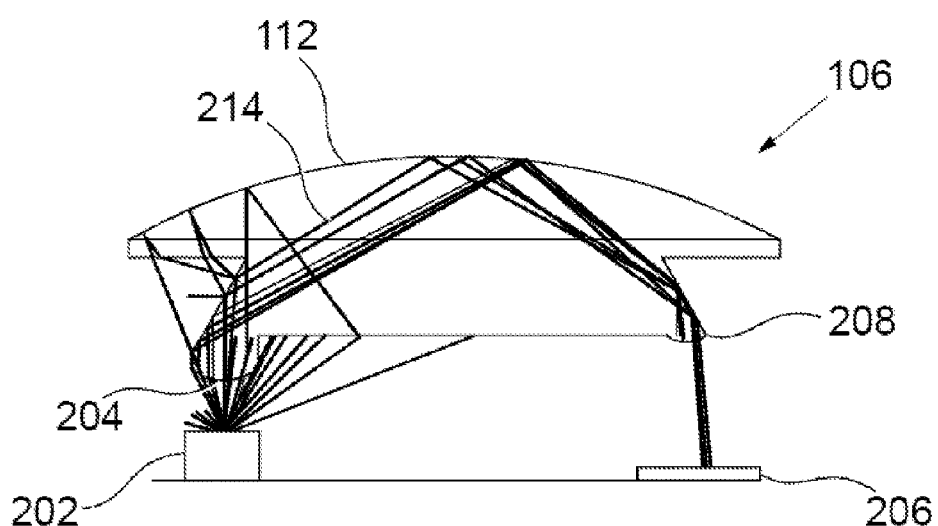
FIG. 2 is an optical diagram of the FIG. 1 device, given by way of example.

FIGS. 1 and 2 show a particular type of optical navigation device module suitable for the application embodiments. This optical navigation device module is described in detail in co-pending application number GB0908899.8. It should be noted that this optical navigation device is described by way of example only, and any suitable optical navigation device using reflection or scattering off a mousing surface can be used.

The optical navigation device module 100 includes a base plate 102, an optical element 106 which incorporates a clip 104 (the optical element will be described in greater detail below), an illumination source 108, such as an LED, and a sensor 110. The overall construction of the optical navigation device module 100 is of a low profile construction making it suitable for mobile devices. The actual size of the overall package containing the optical navigation device sits under a cap of about 7 mm in diameter and the module itself has a maximum dimension of about 5.8 mm.

The optical element 106 may be molded from a single piece of plastic and provides a so called mousing surface 112. An example of the type of plastic material is a monolithic optical block made of a plastics material such as poly (methyl methacrylate) also known as PMMA; although it will be appreciated other materials (such as Polycarbonate, Cyclophane copolymer) may alternatively be used.

As can be seen in FIG. 2, this particular type of optical navigation device 106 uses the optical layout for a frustrated total internal reflection (F-TIR) device 106, although direct imaging systems and other systems are equally applicable to be used in place of the F-TIR device 106.

The F-TIR device 106 includes an LED 202 which emits a source of radiation directed by optical element 204 to the internal surface of the mousing surface 112. A further optical element 208 then directs any reflected radiation from surface on to sensor 206.

The LED 202 may be of any appropriate type and may be mounted on a substrate. In a particular example, the LED emits in the near infrared range for example between about 700 to 900 nm. It should be noted that the radiation emitted by the LED may be any appropriate wavelength. If the radiation is in the UV, optical or IR ranges the radiation may be referred to as illumination.

The optical element 204 directs the LED illumination into the monolithic optical block which forms the optical element 106. The optical element 204 may be in any appropriate form, for example, a single convex surface; a series of lenslets configured as a "fly eye" structure; or any other suitable structure capable of providing near collimated illumination at the internal surface. The optical element 204 may be capable of being tilted in order to control the illumination pattern and direction of the beam at the mousing surface.

The mousing surface 112 includes an internal surface and an external surface. At the mousing surface any object with a refractive index which is placed in contact with the external surface will frustrate the total internal reflection of the beams 214 at the internal surface. A suitable object may include a finger, pointer, hand or other object or feature. A so-called frustrated reflection will thus be generated and the resulting pattern is focused by optical element 208 onto the sensor 206. The mousing surface 112 is designed here to be smaller than the object manipulating it such that the object covers most of all of the mousing surface, in use. In a main embodiment the surface is smaller in area than a fingertip, and is designed for finger manipulation.

The internal surface is relatively smooth when compared to the features which give rise to the F-TIR. Illumination reflected from the internal surface when there is no object close to the mousing surface is virtually 100% reflected. However, when the reflection is frustrated only about 10% or less of the illumination is reflected, thus resulting in contrast ratio of about 1:10 in the present example. Note that at 850 nm most of returned signal is from scattering at the object in contact with the optical element 106 (e.g. the skin of the user's finger).

The optical element 208 may be of any appropriate form, for example a single convex surface; and includes a stop (not shown) so that an image of F-TIR surface is produced at the sensor.

The frustrated reflection directed on to the sensor is detected in order to identify the point or points of contact of the object in contact with the external surface. Subsequent measurements of the point or points of contact will provide information corresponding to the movement of object on the external surface. The action or movement of the object can then be translated into actions to operate a mobile personal computer.

The system works at a frame rate of 1 to 10 kHz in order to detect relative movement or movements of one or more features at the F-TIR. The features detected at the F-TIR are features between about 0.5 mm and 30 µm in size and correspond, for example, to finger print features of a user.

The smaller features provide a greater ability to detect motion than the larger ones. The sensor operates to determine motion vectors of one or more features from one frame to the next in accordance with the frame rate. Correlation from one frame to the next identifies the motion vectors and rate of movement which can then be translated into an appropriate control action for the mobile computer. The frame rate is set by the refresh rate of the sensor. The exposure may be achieved by a pulsating illumination source (LED) or by sampling the sensor output at the required rate.

It may be possible to calibrate the sensor by determining the sensor illumination when there is no radiation source for F-TIR and comparing this with the sensor, when detecting F-TIR. This calibration may occur at the start of each use of the optical navigation device or on a frame to frame basis.

Figure 3:
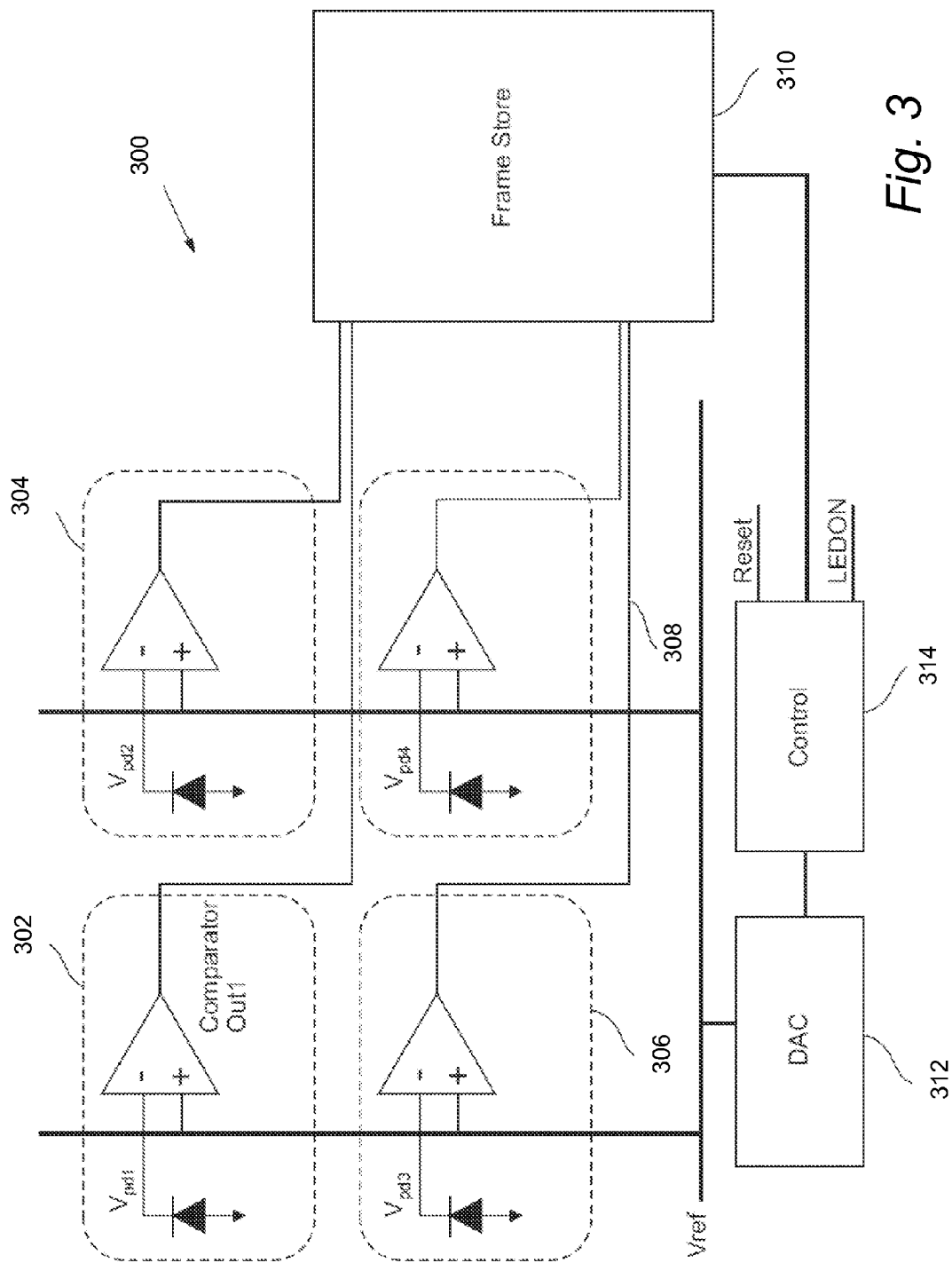
FIG. 3 is a diagram of an optical navigation device processing circuit, in accordance with an embodiment.

FIG. 3 is a block diagram of a processing circuit 300. The sensor 206 is typically an array of pixels arranged in rows and columns, each pixel having associated therewith such a processing circuit 300. For clarity of illustration, the diagram shows four amplifier and photo-diode arrangements 302, 304, 306 and 308 although it will be appreciated that in fact a typical array will have more pixels than this. For example, a real array may have 18×18; 20×20; 25×25 or 30×30 pixels, and perhaps an even higher numbers of pixels. The circuit also includes a frame store module 310, a digital to analog converter 312 and control circuitry 314. This circuit deals with a single pixel. However, to avoid the problems of pixel-pixel mismatch and any thermally induced noise the output from individual pixels may be combined in any appropriate manner. For example, an appropriate manner may include averaging, summing or summing and truncating the data.

The motion of a finger or other object over the mousing surface is monitored by a motion detection algorithm forming part of control circuit 314. The motion detection algorithm may use techniques such as, for example, single pixel motion vector determination or multi-pixel motion vector determination.

It is proposed that the finger mouse be used to input a pattern so as to perform an action such as to unlock the device in which the finger mouse is comprised. While any action could be activated by such a pattern input, it will be apparent that the concepts disclosed herein are particularly suited to security actions. A device user may be prompted to input a pattern in much the same way as they currently input a password or personal identification number (PIN), so as to unlock the device, or to enable particular device functions. The pattern may be initially captured and stored by the device during a "pattern set" stage, in a similar manner to the user selecting a new PIN or password.

Figure 4:
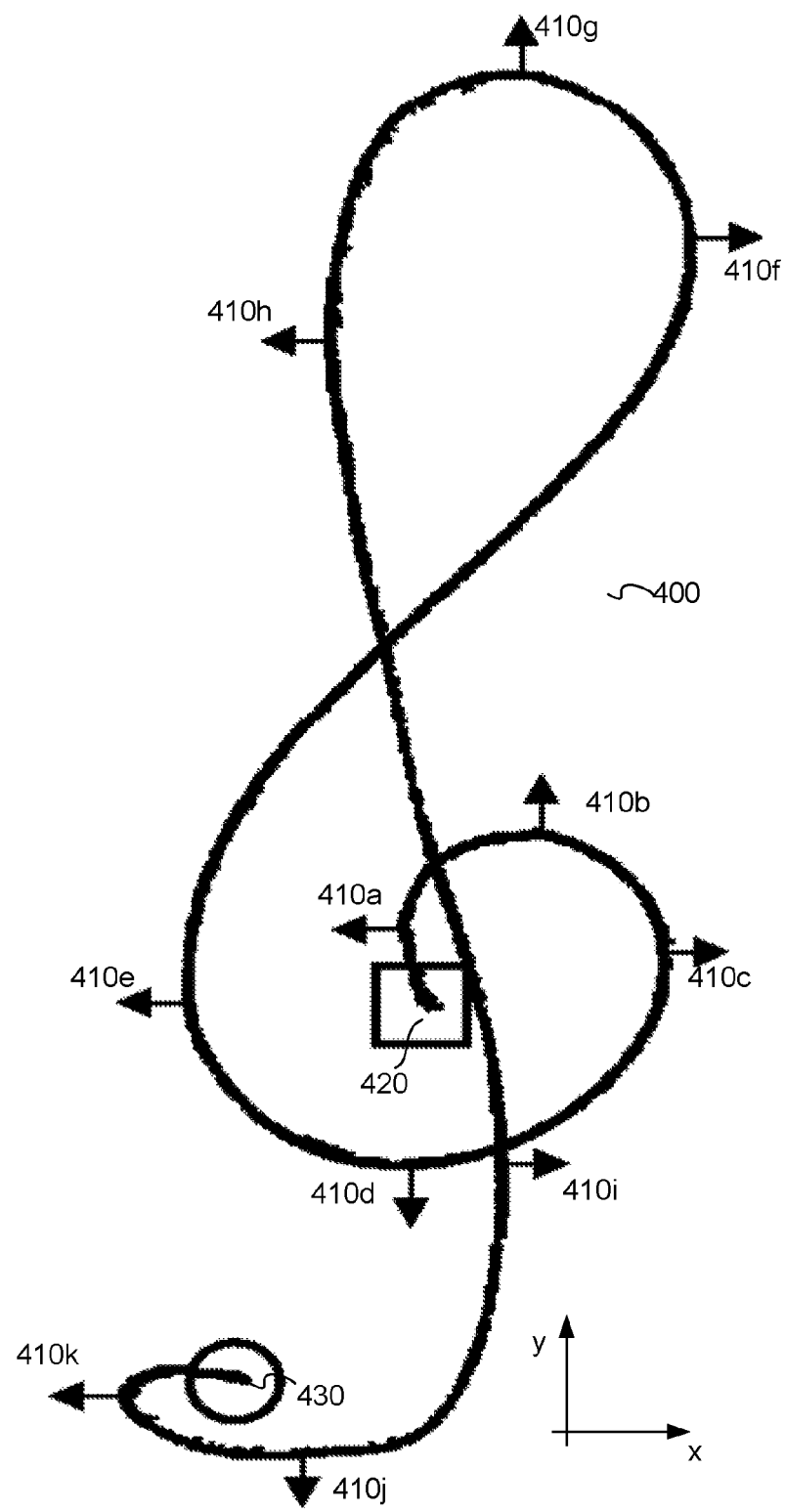
FIG. 4 is an example pattern illustrating an embodiment.

FIG. 4 illustrates how the motion detection algorithm operates in accordance with an embodiment of the invention. It shows an example pattern 400 comprising a line having turning points 410a-410k, a start position 420 and a finish position 430. As the pattern 400 is input by a finger/stylus on the mousing surface, positional data is read and the most recent movement in both the x and y axes is stored. When movement in either axis is seen to reverse its direction, i.e. start decreasing instead of increasing or vice versa, a turning point 410a-410k is defined. Ideally, hysteresis should be included to prevent noise creating unwanted turning points.

The pattern 400 is defined and stored in terms of the directions attributed to each turning point 410a-410k between the start position 420 and end position 430 and their chronological order. Therefore, in the example of FIG. 4, the pattern is defined as 11 turning points with attributed directions in the order WNESWENWESW, where E is east, W is west, N is north and S is south. Clearly the skilled person will appreciate that these direction labels are provided relative to the orientation of the drawn figure (with N-S along the y-axis, as per convention) purely for illustration. They do not represent any absolute directions and are not described in the format that they would actually be stored.

In order to unlock the device, (or perform any other action), the system works to compare the set of turning points of the inputted pattern against that of an earlier stored reference pattern (such as one entered by the user at an earlier time in order to set the reference pattern), with the pattern assumed to be the same if the sets correspond. In an embodiment, only when either the entire reference pattern is matched correctly or a mismatching pair of turning points is observed does the system output a result. Allowances may be added, such as the potential for two turning points to be the incorrect way around, without passing a negative result if the user requires a less secure, but more robust system.

It should be appreciated that this concept of turning point comparison to compare a pattern input so as to perform a control action is not limited to implementation in a finger mouse or optical navigation device in general. It is equally applicable to other types of navigation device.

The orientation of the axes by which the turning points are defined, and the number of axes, can be chosen as desired. A turning point may be defined when the line reverses direction along more or less than the four directions (two axes) shown in the figure. In other words a turning point is occurs where the tangent of the continuous line is parallel to one of the axes.

Figure 5:
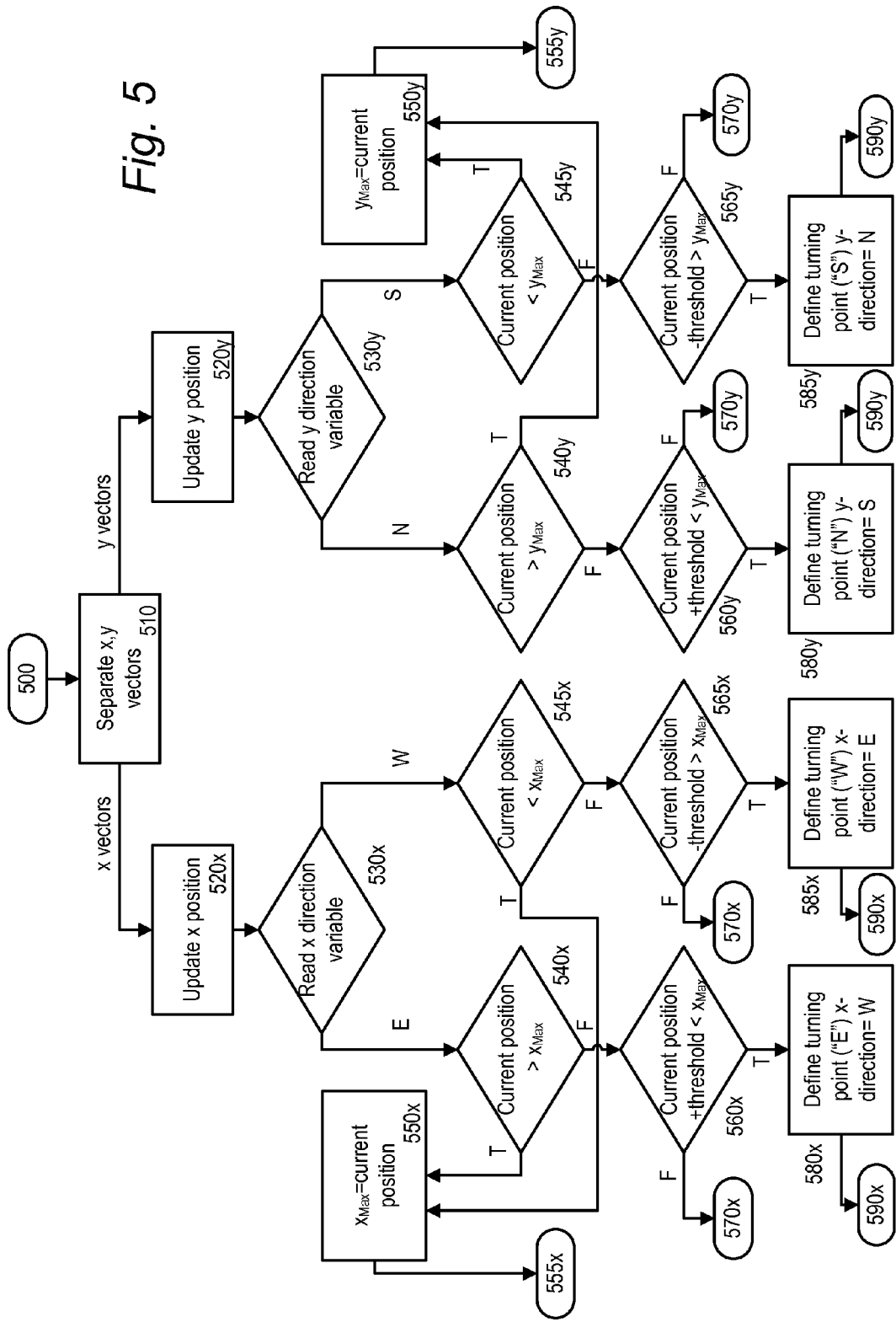
FIG. 5 is a flowchart of a turning point detection algorithm usable in accordance with an embodiment of the invention.

FIG. 5 is a flowchart of an algorithm used in a specific embodiment to identify turning points. At step 500 a vector received from navigation algorithm, which is then separated, at step 510 into its constituent orthogonal x and y vectors. The following steps are divided into two branches, one to find turning points in the y direction (step labels suffixed y) and one to find turning points in the x direction (step labels suffixed x). These are essentially identical (other than the relevant directions—the y branch determining "North" and "South" turning points and the x branch determining "East" and "West" turning points), and therefore the y branch will be described only.

At step 520y the y-position is updated and at step 530y, the y-direction variable is read. The y-direction variable (and x-direction variable) may be provided with a value before the algorithm is first run by averaging the initial movements of the drawing object, as seen over a period of time.

If, at step 530y, the determination of direction is "North" N (i.e. "up" or a value of positive sign), the algorithm determines whether the current position is greater than a variable $y_{Max}$ (step 540y). Variables $y_{Max}$ and $x_{Max}$ are, in one embodiment, defined as origin (0,0) when the algorithm is run for the first time. This means that, due to the thresholds mentioned in relation to steps 560y and 565y below, variable $y_{Max}$ will be set at least once before a turning point is defined (as will variable $x_{Max}$). If the result of the determination at step 540y is True, then variable $y_{Max}$ is updated with the current position value and the algorithm stopped 555y, and run again with new vector received. If the result of the determination at step 540y is False, an optional step 560y determines whether the total of the current position and a predetermined threshold is less than variable $y_{Max}$. This ensures that turning points are defined only for definite deliberate directional changes and not, for example, unintentional line deviations or kinks. If the result of the determination at step 560y is False the algorithm is stopped 570y and run again with new vector received. If however the result of the determination at step 560y is True, a turning point is defined with direction "North" N attributed to it; and the y-direction variable is flipped to "South" S (i.e. "down" or a value of negative sign): step 580y. The algorithm then stops 590y and is run again with new vector received.

Where the determination at step 530y is "South" S, the algorithm follows steps 545y, 565y and 585y. These mirror those of 540y, 570y and 580y respectively, but with opposite sign determinations so as to define turning points in the opposite direction to those defined according to the previous paragraph.

Figures 6A, 6B:
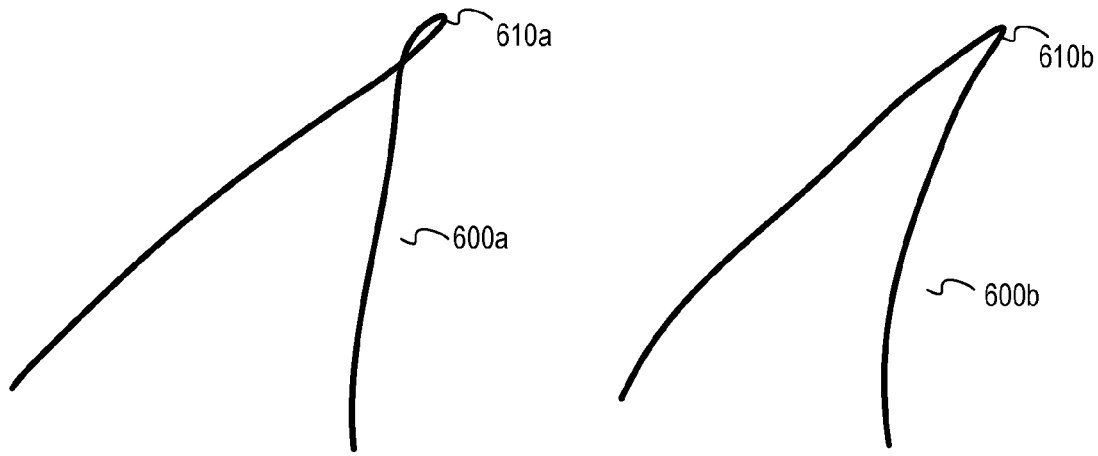
FIGS. 6a and 6b illustrate the problem of two successive turning points very close together.

In certain situations, it is possible that two successive turning points can be located extremely close to each, therefore presenting the opportunity for them to be determined to be the opposite way around for almost identical gestures. FIGS. 6a and 6b represent a situation (slightly exaggerated for clarity) where this occurs. When passed through the turning point extraction algorithm of FIG. 5, the line 600a of FIG. 6a would output turning points East followed by North whereas the line 600b of FIG. 6b would output turning points North followed by East. Evidently this causes problems when trying to compare patterns. It is therefore proposed that any of the concepts disclosed herein use a modified algorithm. The modified algorithm checks for turning points with a close proximity to one another during turning point extraction. Where pairs of turning points having a proximity within a predetermined threshold are found, they are replaced with a single turning point having an appropriate direction. The appropriate direction should be representative of the directions of both turning points replaced. In the example of FIGS. 6a and 6b, both lines 600a and 600b can be represented by a single turning point "North-East" (or an equivalent label reflecting this) at points 610a and 610b respectively. Not only does this solve the problem described, but it also increases the security of the system as extra options are added.

Figure 7:
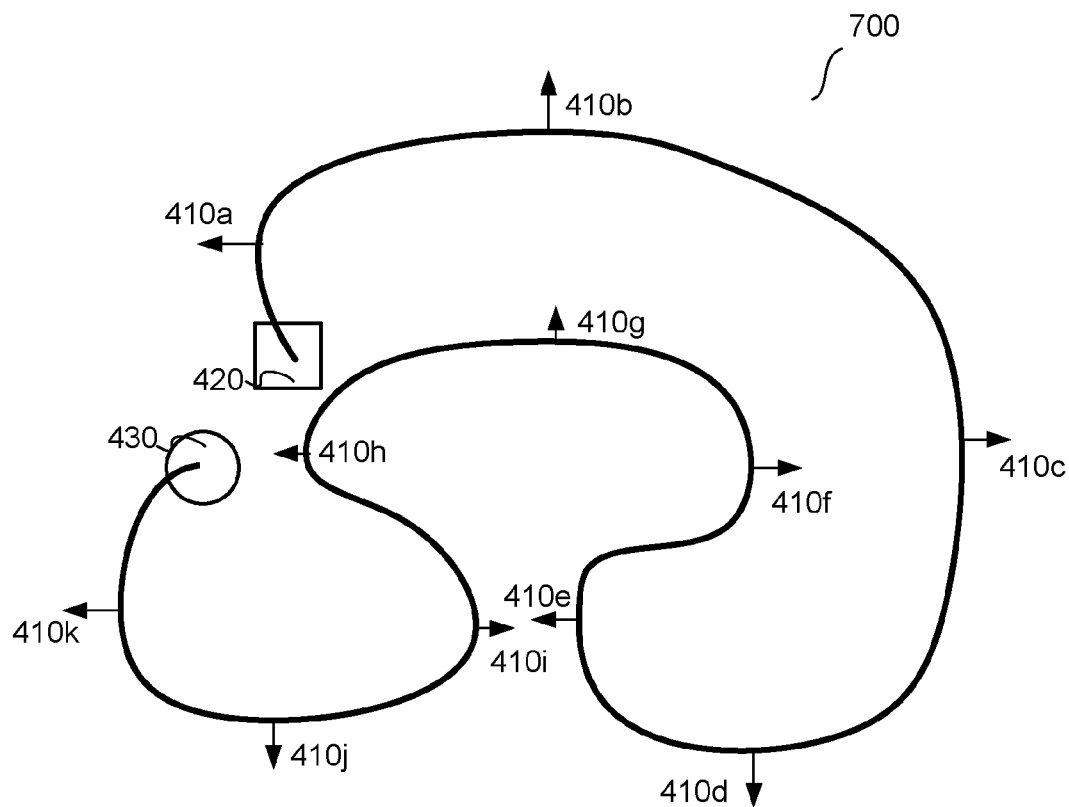
FIG. 7 illustrates an equivalent pattern to that of FIG. 4 when described by its turning points.

Comparing the pattern purely by comparing the chronological order of its set of turning points is sufficient in most situations. However, it is possible that quite different patterns may have identical sets of turning points, meaning that false positives may be returned. FIG. 7 illustrates such an example. It shows a completely different pattern 700 to that of FIG. 4, but with an identical set of turning points 410a-410k (using the two axes/four direction example). Consequently it is proposed to optionally add a further comparison step to compare the inputted pattern to a reference pattern to address this issue.

Such a step comprises a multi-point analysis of the turning points. This involves storing the position of each tuning point in addition to the direction attributed to it, as it is entered (this has to have been done for the reference pattern also). The positions can then be compared by vector comparison or by comparing the positions of pairs of turning points relative to each other. For example, in FIG. 4 the turning point 410g can be seen to be higher (above in the x-domain) relative to turning point 410b. However, in FIG. 7 the relative position of these turning points is reversed. Consequently the patterns of FIG. 4 and FIG. 7 can be distinguished. Such a relative comparison can be done for all possible pairs of turning points, both in terms of x and y. The patterns would only be considered to match, and the device unlocked, if both steps are positive. Allowance may be made where, in the reference pattern, the turning points are close together in the direction in question, as these are more likely to swap position when the pattern is repeated. For example, it may be that only pairs of turning points a certain threshold distance apart in the reference pattern will be used in this step. Therefore if pattern 400 of FIG. 4 is the reference pattern, it may be deemed that (depending on the threshold set) that the turning point pair 410*d* and 410*g* are too close in the x-domain and therefore their relative positions would not be compared to the relative positions of the inputted pattern. Clearly this step represents an additional computational burden, but is more secure.

It is also possible to define additional turning points to make the multi-point analysis even more robust. For example, turning points may be defined when the line is seen to reverse direction along axes 45 degrees to the x and y axes, in addition to the x and y axes. In such a case, more turning points will be defined, each of which can have one of 8 directions attributed to it.

Advantages of the concepts described herein include:
The pattern input is integrated with the optical finger mouse thereby saving space on the host device.
It is difficult for another person to observe a user's unlock pattern to gain access to the device.
Little memory is required to store the required reference information.
The device is scale invariant to input patterns.

The sensor is of any appropriate type and may be a CMOS sensor having an array of pixels for measuring reflected light at different locations of the imaging element 104 to produce an image thereon.

The LED may be of any appropriate type and may generate a source in the "optical" or non-optical ranges. Accordingly, reference to optics and optical are intended to cover wavelengths which are not in the human visible range.

The optical navigation device may be used in any suitable devices such as a mobile or smart telephone, other personal or communications devices, a computer, a camera, a remote controller, access device or any other suitable device.

The imaging element may not necessarily be an FTIR surface, but any other appropriate surface. If this is the case any reflection may be effected by the finger in proximity with the imaging element rather than the FTIR surface.

It will be appreciated that there are many possible variations of elements and techniques which would fall within the scope of the present invention. For example, while the above described the embodiments in terms of an optical navigation device such as a finger mouse, aspects of the invention are equally applicable to any navigation device with which a pattern can be inputted, including a conventional mouse, joystick, trackball, touchscreen etc.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An optical device, comprising
   a radiation source capable of producing a beam of radiation;
   a sensor for receiving an image; and
   an optical element for identifying movement of an object on a first surface to thereby enable a control action to be carried out and being operable such that a whole of an imaged area of the first surface is substantially covered by said object in normal use;
   wherein said optical device is operable to:
      receive from said object on said first surface an input as a continuous line;
      detect all turning points of the continuous line, wherein each turning point is a direction reversal of the continuous line with respect to one of two predetermined axes;
      store a set of direction indicators describing the continuous line, the set of direction indicators comprising a direction indicator associated only with the turning points of the continuous line in chronological order; and
      compare the set of direction indicators to a set of reference direction indicators and perform a function if the set of direction indicators is substantially similar to the set of reference direction indicators.

2. An optical device as claimed in claim 1, operable such that there are two of said predetermined axes in a same plane and 90 degrees apart.

3. An optical device as claimed in claim 1, operable such that a turning point is only defined when the continuous line extends a threshold distance in the reverse direction, following said determination of the continuous line reversing direction.

4. An optical device as claimed in claim 1, operable to apply hysteresis to prevent noise creating unwanted turning points.

5. An optical device as claimed in claim 1, operable to further store a position of each tuning point and compare relative positions of the turning points to relative positions of corresponding reference turning points.

6. An optical device as claimed in claim 5, wherein comparing relative positions of the turning points comprises comparing the relative positions of multiple pairs of turning points to relative positions of multiple pairs of corresponding reference turning points.

7. An optical device as claimed in claim 6 operable such that only pairs of turning points a predetermined threshold distance apart are used when comparing the relative positions of multiple pairs of turning points to relative positions of multiple pairs of corresponding reference turning points.

8. An optical device as claimed in claim 1, operable such that, should pairs of successive turning points be less than a threshold distance apart, the pairs of successive turning points are replaced with a single turning point, the direction indicator attributed to said single turning point reflecting the direction indicators attributed to both of the replaced turning points.

9. An optical device as claimed in claim 1, wherein said function is to unlock an apparatus in which the optical device is comprised.

10. An optical device as claimed in claim 1, wherein said imaged area is of the order of magnitude of 1 mm$^2$.

11. An optical device as claimed in claim 1, wherein said optical element comprises at least one frustrated total internal reflection (F-TIR) surface capable of causing frustrated total internal reflection of the beam of radiation when said object contacts said first surface to thereby generate the image which is capable of being translated into said control action, said image being generated from radiation which is totally internally reflected at the F-TIR surface.

12. An optical device as claimed in claim 11 wherein the optical element comprises at least one further surface for directing radiation from the radiation source to at least one F-TIR surface, the at least one further surface and the F-TIR surface being angled with respect to each other; wherein the optical element comprises at least one additional surface for directing radiation from the F-TIR surface to the sensor the at least one additional surface and the F-TIR surface being angled with respect to each other, and wherein the radiation measured at the sensor is radiation which is totally internally reflected at the at least one further surface, the F-TIR surface and the at least one additional surface.

13. An optical device as claimed in claim 1, wherein the optical element is formed from a plastics material.

14. A device for receiving an input to thereby enable a control action to be carried out, said device being operable:
   to receive an input describing a pattern comprising a continuous line;
   to detect all turning points of the continuous line, wherein each turning point is a direction reversal of the continuous line with respect to one of two predetermined axes;
   to store a set of direction indicators describing the continuous line, the set of direction indicators comprising a direction indicator associated with only the turning points of the continuous line in chronological order;
   to compare the set of direction indicators to a set of reference direction indicators defining a reference pattern; and
   to perform a function if the set of direction indicators is substantially similar to the set of reference direction indicators.

15. A device as claimed in claim 14 operable such that there are two of said predetermined axes in a same plane and 90 degrees apart.

16. A device as claimed in claim 14, operable such that a turning point is only defined when the continuous line extends a threshold distance in the reverse direction, following said determination of the continuous line reversing direction.

17. A device as claimed in claim 14, being operable to apply hysteresis to prevent noise creating unwanted turning points.

18. A device as claimed in claim 14 being operable to compare the relative positions of multiple pairs of turning points to relative positions of multiple pairs of corresponding reference turning points.

19. A device as claimed in claim 18 operable such that only pairs of turning points a predetermined threshold distance apart are used when comparing the relative positions of multiple pairs of turning points to the relative positions of multiple pairs of corresponding reference turning.

20. A device as claimed in claim 14, operable such that, should pairs of successive turning points be less than a threshold distance apart, the pairs of successive turning points are replaced with a single turning point the, direction indicator attributed to said single turning point reflecting the direction indicators attributed to both of the replaced turning points.

21. A device as claimed claim 14, wherein said function is to unlock an apparatus in which the device is comprised.

22. A computer apparatus incorporating a device as claimed in claim 1.

23. A portable communications apparatus incorporating a device as claimed in claim 1.

24. A remote control handset apparatus incorporating a device as claimed in claim 1.

25. An optical device as claimed in claim 13 wherein, the plastics material is poly(methyl methacrylate) or polycarbonate.

26. An optical device as claimed in claim 1, wherein each turning point is defined where a tangent to the continuous line is parallel to one of said predetermined axes.

27. A device as claimed in claim 14, wherein each turning point is defined where a tangent to the continuous line is parallel to one of said predetermined axes.

28. An optical device for receiving an input to enable a function, said device being operable to:
   receive an input comprising a pattern;
   detect all turning points of the pattern, wherein each turning point is a direction reversal of the pattern with respect to one of two orthogonal axes;
   store a set of direction indicators, the set of direction indicators comprising only the direction indicators associated with the turning points of the pattern in sequential order of the pattern;
   compare the set of direction indicators to a reference set of direction indicators associated with a reference pattern; and
   perform a function if the set of direction indicators is substantially similar to the stored set of direction indicators.

29. The optical device of claim 28 wherein each turning point is defined where a tangent to the pattern is parallel to one of said at least two orthogonal axes.

* * * * *